United States Patent
Friedrich et al.

(10) Patent No.: US 11,478,960 B2
(45) Date of Patent: Oct. 25, 2022

(54) METHOD FOR PRODUCING VEHICLE REPLACEMENT PARTS

(71) Applicant: Bayerische Motoren Werke Aktiengesellschaft, Munich (DE)

(72) Inventors: Martin Friedrich, Unterschleissheim (DE); Dominik Rietzel, Neuried (DE); Bernhard Schmid, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 301 days.

(21) Appl. No.: 16/708,681

(22) Filed: Dec. 10, 2019

(65) Prior Publication Data

US 2020/0180193 A1    Jun. 11, 2020

(30) Foreign Application Priority Data

Dec. 11, 2018 (DE) ............ 10 2018 131 754.9

(51) Int. Cl.
| | | |
|---|---|---|
| *B29C 39/02* | (2006.01) | |
| *B29C 39/40* | (2006.01) | |
| *B60S 5/00* | (2006.01) | |
| *B60R 13/02* | (2006.01) | |

(52) U.S. Cl.
CPC ............ *B29C 39/021* (2013.01); *B29C 39/40* (2013.01); *B60S 5/00* (2013.01); *B60R 13/0206* (2013.01)

(58) Field of Classification Search
CPC ......... B29C 39/021; B29C 39/40; B60S 5/00; B60R 13/0206
See application file for complete search history.

(56) References Cited

U.S. PATENT DOCUMENTS

| | | | | |
|---|---|---|---|---|
| 2,337,239 | A  * | 12/1943 | Hall | ............... B60R 13/0243 52/511 |
| 8,782,878 | B2 * | 7/2014 | Morden | ............... B23P 19/06 29/720 |
| 2009/0094800 | A1 | 4/2009 | Reznar | |
| 2012/0284975 | A1 | 11/2012 | Clarke et al. | |
| 2014/0342119 | A1 * | 11/2014 | Kastell | ............... B29C 43/203 428/141 |
| 2019/0291333 | A1 * | 9/2019 | Whitehead | ............ B29C 51/421 |

OTHER PUBLICATIONS

German-language Search Report issued in German Application No. 10 2018 131 754.9 dated Oct. 20, 2021 with a partial English translation (12 pages).

* cited by examiner

*Primary Examiner* — Galen H Hauth
(74) *Attorney, Agent, or Firm* — Crowell & Moring LLP

(57) ABSTRACT

A method produces a vehicle replacement part for a first vehicle component of a connecting system, which is fixed to a second vehicle component via a detachable clip connection. The first vehicle component has a male fixing element, and the second vehicle component has a female fixing element. To connect the first vehicle component to the second vehicle component, the male fixing element is plugged into the female fixing element and is latched. The production method of the vehicle replacement part provides an unfinished part, which is dimensioned to produce the vehicle replacement part. Then, the unfinished part is reshaped in accordance with the geometry of the first vehicle component. Male fixing elements are then provided and, in the last step, the male fixing elements are joined to the reshaped unfinished part.

11 Claims, 2 Drawing Sheets

METHOD FOR PRODUCING VEHICLE REPLACEMENT PARTS

CROSS REFERENCE TO RELATED APPLICATION

This application claims priority under 35 U.S.C. § 119 from German Patent Application No. 10 2018 131 754.9, filed Dec. 11, 2018, the entire disclosures of which are herein expressly incorporated by reference.

BACKGROUND AND SUMMARY OF THE INVENTION

The invention relates to a method for producing a vehicle replacement part for a first vehicle component of a connecting system, which is fixed to a second vehicle component via a detachable clip connection.

At the present time, various original shaping or reshaping tools are used for different special accessories. In particular in the case of decorative elements, in order for example to produce painted, foiled, veneered or leather-covered decorations, various partly very complicated undercut injection molding tools with various sliders and specific temperature control are used. This leads to reduced flexibility (e.g. in running-time measures) and in development to long design, milling and layout times until the start of mass production, and is associated with high development costs. Shaping by means of injection molding has hitherto represented the prior art. In the substructure, specific clamps (e.g. omega clips) are used in order to fix the decorations to the supporting structure. This currently permits only efficient central production in high numbers. Decentralized production to increase locally produced components or the supply of after sales and the provision of replacement parts for previous models are only associated with high costs.

The injection molding tools used must be implemented differently with great effort. To this end, various internal and external resources of a company are needed. At the present time, using the example of a decorative panel, this means that a leather-covered decorative panel is produced on a different tool than a wooden decoration or a variant made of aluminum. In this case, a large number of tools would have to be developed, allocated and maintained for left-hand and right-hand models with different requirements. For this multiplicity of tools, high capitalization is to be expected.

It is therefore an object of the present invention to provide a method for producing a vehicle replacement part which permits flexible and decentralized production, at the same time reduces the necessary number of tools and, moreover, is suitable to produce replacement parts for after sales and previous models.

According to the invention, therefore, a method is provided for producing a vehicle replacement part for a first vehicle component of a connecting system, which is fixed via a detachable clip connection to a second vehicle component. The first vehicle component has a male fixing element, the second vehicle component has a female fixing element. To connect the first vehicle component to the second vehicle component, the male fixing element is plugged into the female fixing element and latched. The production method of the vehicle replacement part comprises the following steps:
1) providing an unfinished part, which is dimensioned for the production of the vehicle replacement part,
2) reshaping the unfinished part in accordance with the geometry of the first vehicle component,
3) providing male fixing elements,
4) joining the male fixing elements to the reshaped unfinished part.

The basic idea of the invention is to design the entirety of the body structure such that easy clipping on of vehicle replacement parts without using additional fastening elements is made possible. If these fixing methods are used, it is possible to use reshaped instead of originally shaped decorations and to fix a male fastening element on the inside of the vehicle replacement part. In this way, development costs and development times for the necessary tools are reduced, since only simple reshaping tools instead of complex original shaping tools can be used. This leads to improved amortization of the tools used with lower investment costs. The tools can continue to be used in the revision of a vehicle model and life-cycle management. Decentralized production of the decorations can be implemented, since the basic investment is reduced. Consequently, the number of locally produced components can be increased. Following the end of mass production, it is necessary for fewer tools to be put into store and maintained. Post-production in reshaping can be implemented more simply, since, for example, starting up the production line is dispensed with. As a result, in turn the costs for after sales and previous models are reduced considerably. Moreover, by means of the connecting system, the disassembly of attached parts in the event of service and also for the customer is simplified. The recycling of the original first vehicle component is simpler as a result and, because of a lower number of parts for the fixing, since no separate sub-carriers have to be used, weight advantages result.

In one advantageous design variant provision is made for the reshaping of the unfinished part in step 2), i.e. the reshaping of the unfinished part in accordance with the geometry of the first vehicle component, to be carried out by means of reshaping tools matched specifically to the geometry of the corresponding first vehicle part. It is beneficial that, by means of the reshaping tools, vehicle replacement parts can be produced which are identical to the first vehicle component in its geometric configuration. In this way, an optimal vehicle replacement part which can be fixed to the corresponding second vehicle component is produced.

In a preferred embodiment of the production method, the joining method of the male fixing elements in step 4), i.e. the joining of the male fixing elements to the reshaped unfinished part, is welding or adhesive bonding. These two joining methods are particularly well suited to fixing the male fixing element. In the case of adhesive bonding, it is possible for the joining parts, for example, not to be subjected to high temperatures, and it is possible for extremely different materials to be used. Furthermore, it permits large-area connection of thin parts and is very economical. Welding offers stable, robust connections, is integral and thus not detachable. In addition, a welded connection is relatively simple to produce, an inexpensive connection and can be implemented in virtually any position and environment. Under certain conditions, welded connections of different materials are possible.

In one exemplary embodiment of the production method, provision is made for the joining positions of the male fixing elements to the reshaped unfinished part in step 4), i.e. the joining of the male fixing elements to the reshaped unfinished part, to correspond to the positions of the male fixing elements of the first vehicle component. It is advantageous here that the vehicle replacement part can be fixed to the vehicle in the same position at which the first vehicle component was attached.

Furthermore, an embodiment in which the male fixing element consists of a spherical element and the spherical element comprises one or more balls is beneficial. The round shape of the balls is beneficial and substantial, since the effect of this shape is that no alignment is needed in the provision of the male fixing elements in step 3), i.e. the provision of male fixing elements, during the production and/or the joining.

Moreover, it is advantageous to form the female fixing element as a hole or a slot. A vehicle or motorcycle has the holes on the corresponding second vehicle components as receiving elements. This makes it possible for the clip connection to be used as a standardized connecting element for all vehicles and motorcycles.

In a further advantageous variant, the invention provides for the unfinished part provided to consist of wood laminate. Specific materials such as the wood laminate, plastic, sheet metal and connections of these materials can be processed during the reshaping, as compared with original shaping. In this way, a concept relating to individualizing on site precisely in accordance with customer wishes can be implemented without requiring a corresponding order.

In a development of the present production method, provision is also made for the provision and joining of the male fixing elements in step 3) and 4) to be carried out automatically by way of at least one robot arm. The robot arm supplies a suitable solution for conveying the appropriate male fixing elements automatically to their fixing position. In addition, robot arms are capable of implementing the joining method step. Here, it does not matter whether welding or adhesive bonding is involved.

In one design variant, the production method according to the invention of the vehicle replacement part provides for the ratio of the size of the hole or slot of the female fixing element to the circumference of the spherical element to be able to be changed by way of adapting the circumference of the spherical element.

In this way, the ball is given further functions. For example, in the event of an accident, the cladding can be unclipped and the clip connection thus forms an intended fracture point, without the decoration or the cladding part breaking. Furthermore, this permits tolerance compensation. In addition, clearly defined pressing forces result and the assembly and disassembly force is adjustable as a result.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
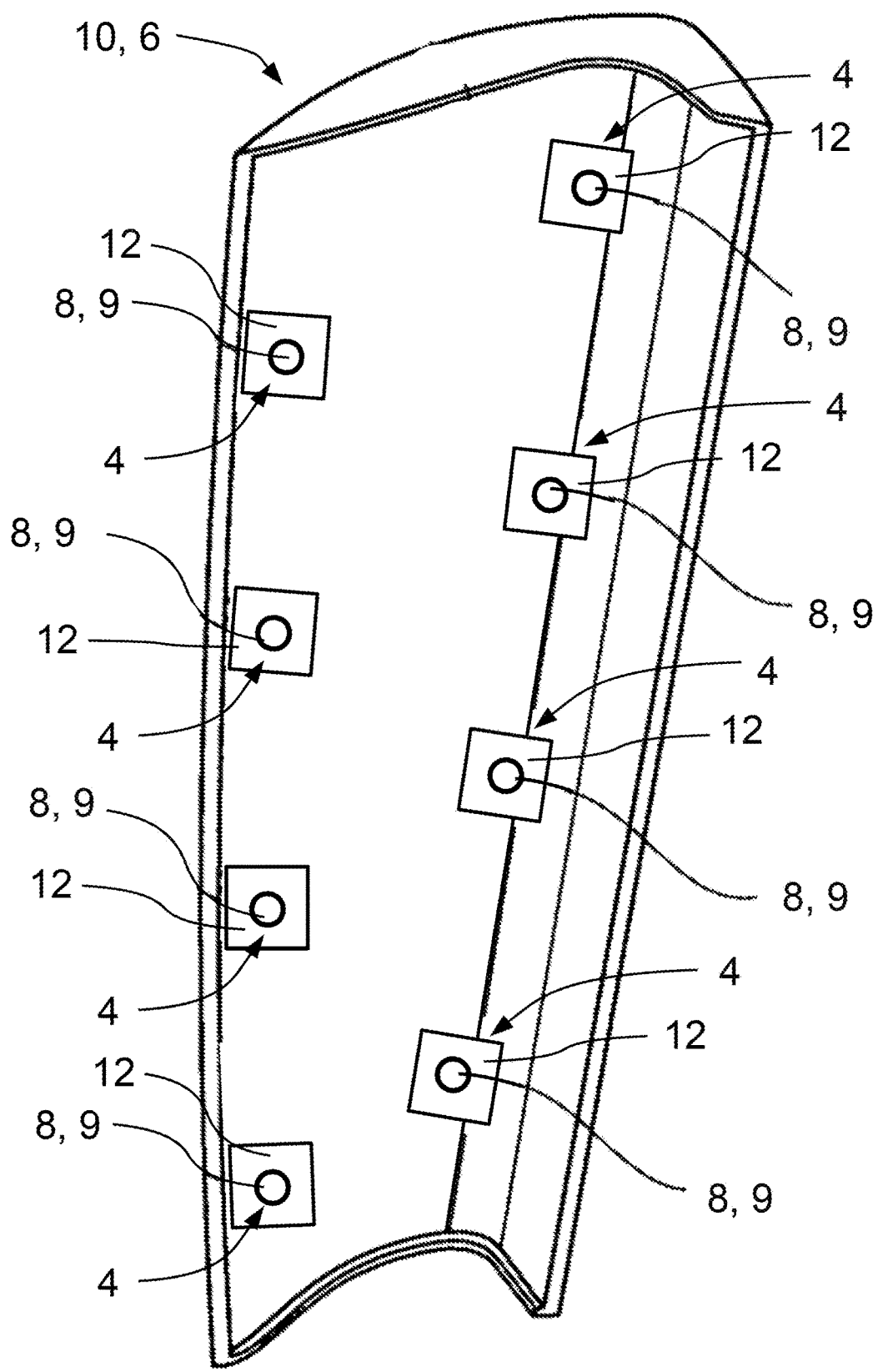
FIG. 1 is a perspective view of a vehicle replacement part.
Figure 2:
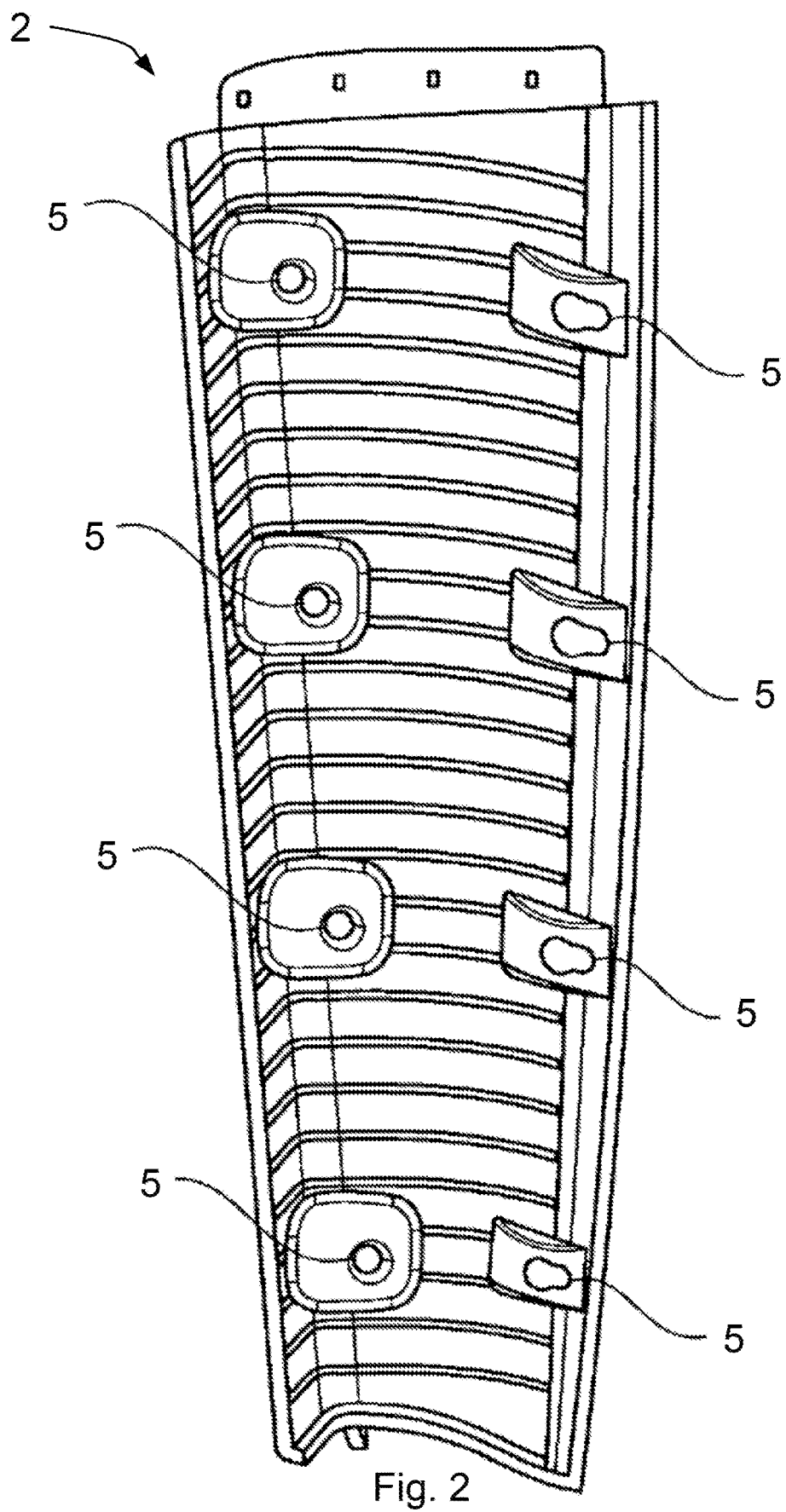
FIG. 2 is a perspective view of a second vehicle component.

FIG. 1 represents a perspective view of a vehicle replacement part 10 for a first vehicle component, not shown. In this case, the first vehicle component and the vehicle replacement part 10 are a decorative panel for an instrument panel. The geometry of this vehicle replacement part 10 corresponds to the geometry of the first vehicle component. In addition, the male fixing elements 4 are located at the same positions of the male fixing elements of the first vehicle component. The vehicle replacement part 10 in FIG. 1 has a total of eight of these male fixing elements 4, which are welded or adhesively bonded onto the vehicle replacement part 10. In addition, the male fixing elements 4 are formed as a spherical element 8 having a ball 9. To produce a detachable clip connection, these balls 9 of the spherical elements 8 can be plugged into a female fixing element 5 correspondingly provided for this purpose, which is illustrated in FIG. 2. In addition, joining positions 12 for the spherical element 8 are provided on the vehicle replacement part 10 and, in the exemplary embodiment of FIG. 1, are configured as a square projection. On these projections, during the method step 4), i.e. the joining of the male fixing elements 4 to the reshaped unfinished part 6, the male fixing elements 4 can be adhesively bonded or welded at the joining position 12 by way, for example, of a robot arm, which is not illustrated in FIG. 1. The square projection, which forms the joining position 12, projects from the surface of the vehicle replacement part 10. The joining position 12 is designed in such a way that the spherical element 8 can be clipped and latched into the corresponding female fixing element 5, without the corresponding mating piece of the female fixing element 5 striking the surface of the vehicle replacement part 10 during production of the clip connection, and thus the connection cannot be formed. The joining position 12 is configured geometrically in such a way that, in step 2), the reshaping of the unfinished part 6 in accordance with the geometry of the first vehicle component 1 is produced by way of the specifically adapted reshaping tool.

FIG. 2 shows a perspective view of a second vehicle component 5, which has the female fixing elements 5. In a manner corresponding to the male fixing elements 4 of the vehicle replacement part 10 from FIG. 1, the second vehicle component has eight female fixing elements 5. Four of said female fixing elements 5 are formed as round holes, the other four as tapering slots. The male fixing elements 4 from FIG. 1, produced by way of the reshaping and joining, can be inserted with their spherical element 8 into these holes or slots. The female fixing elements 5 are configured in their extent in accordance with the spherical elements 8. The appropriate spherical elements 8 can be pushed and latched into the four female fixing elements 5 which are formed as a slot, and the appropriate four spherical elements 8 can be clipped into the four female fixing elements 5 formed as a hole. In this way, the vehicle replacement part 10, when mounted, is fixed to the second vehicle component 2 and thus also to a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for producing a vehicle replacement part for a first vehicle component of a connecting system, which is fixed to a second vehicle component via a detachable clip connection, wherein
the first vehicle component has male fixing elements, and the second vehicle component has female fixing elements and, to connect the first vehicle component to the second vehicle component, the male fixing elements are plugged into the female fixing elements and are latched, wherein the method for producing the vehicle replacement part comprises the steps of:

1) providing an unfinished part, which unfinished part is dimensioned to produce the vehicle replacement part;
2) reshaping the unfinished part in accordance with a geometry of the first vehicle component;
3) providing the male fixing elements; and
4) joining the male fixing elements to the reshaped unfinished part;
wherein joining positions of the male fixing elements to the reshaped unfinished part in step 4) correspond to positions of the male fixing elements of the first vehicle component.

2. The method for producing the vehicle replacement part according to claim 1, wherein
the reshaping of the unfinished part in step 2) is carried out by use of reshaping tools specifically matched to the geometry of the corresponding first vehicle component.

3. The method for producing the vehicle replacement part according to claim 2, wherein
the joining of the male fixing elements in step 4) is carried out by welding or adhesive bonding.

4. The method for producing the vehicle replacement part according to claim 1, wherein
the joining of the male fixing elements in step 4) is carried out by welding or adhesive bonding.

5. The method for producing the vehicle replacement part according to claim 1, wherein
the male fixing element comprises a spherical element, wherein the spherical element comprises one or more balls.

6. The method for producing the vehicle replacement part according to claim 1, wherein
the unfinished part provided is made of wood laminate.

7. The method for producing the vehicle replacement part according to claim 1, wherein
the provision and joining of the male fixing elements in steps 3) and 4) are carried out automatically by a robot arm.

8. The method for producing the vehicle replacement part according to claim 1, wherein
the female fixing elements are each a hole or a slot.

9. The method for producing the vehicle replacement part according to claim 5, wherein
the female fixing elements are each a hole or a slot.

10. The method for producing the vehicle replacement part according to claim 9, further comprising the step of:
changing a ratio of the size of the hole or slot of the female fixing element to a circumference of the spherical element.

11. A method for producing a vehicle replacement part for a first vehicle component of a connecting system, which is fixed to a second vehicle component via a detachable clip connection, wherein
the first vehicle component has male fixing elements, and the second vehicle component has female fixing elements and, to connect the first vehicle component to the second vehicle component, the male fixing elements are plugged into the female fixing elements and are latched, wherein the method for producing the vehicle replacement part comprises the steps of:
1) providing an unfinished part, which unfinished part is dimensioned to produce the vehicle replacement part;
2) reshaping the unfinished part in accordance with a geometry of the first vehicle component;
3) providing the male fixing elements; and
4) joining the male fixing elements to the reshaped unfinished part;
wherein joining positions of the male fixing elements to the reshaped unfinished part in step 4) correspond to positions of the male fixing elements of the first vehicle component;
wherein the unfinished part provided is made of wood laminate.

\* \* \* \* \*